Oct. 20, 1953  T. W. SHEPPARD  2,656,519
ANGULAR ACCELEROMETER

Filed Aug. 31, 1950  2 Sheets-Sheet 1

INVENTOR.
THOMAS W. SHEPPARD
BY
ATTORNEY

Oct. 20, 1953

T. W. SHEPPARD 2,656,519

ANGULAR ACCELEROMETER

Filed Aug. 31, 1950

INVENTOR.
THOMAS W. SHEPPARD
BY
ATTORNEY

Patented Oct. 20, 1953

2,656,519

UNITED STATES PATENT OFFICE 2,656,519

ANGULAR ACCELEROMETER

Thomas Wellborn Sheppard, Sandy Spring, Md., assignor to the United States of America as represented by the Secretary of the Navy Application August 31, 1950, Serial No. 182,447

8 Claims. (Cl. 336—30)

1

The present invention relates to an apparatus responsive to angular acceleration, and particularly to a damped accelerometer of this type designed for use in telemetric signaling from a guided missile in flight.

Heretofore it was attempted to transmit signals indicative of angular acceleration from such missiles by means of liquid-damped accelelometers, but the results were unsatisfactory because the disturbances of the signal transmitters of such accelerometers, due to the shocks and vibrations of the missile while moving under jet or rocket propulsion, were too severe to permit correct readings to be taken. Moreover this type of accelerometer employed a viscous liquid as a damping component, which necessitated fluid-tight construction and was subject to trouble from the possibility of leakage. The present invention incorporates magnetic damping, due to eddy currents produced in a non-magnetic metal element carried by a movable member of the accelerometer.

An object of the invention, therefore, is to provide an adequately sensitive accelerometer that is responsive to angular acceleration, and that nevertheless is rugged enough to withstand the shocks and vibration encountered in guided missiles.

Another object is to provide simple but effective damping means in an angular accelerometer that is free from liquids.

A further object is to provide an angular accelerometer wherein the angular acceleration is measured as the variation of an inductance.

Other objects and many of the attendant advantages of this invention will be appreciated readily as the same becomes understood by reference to the following detailed description, when considered in connection with the accompanying drawings, wherein.

2

Figure 1:
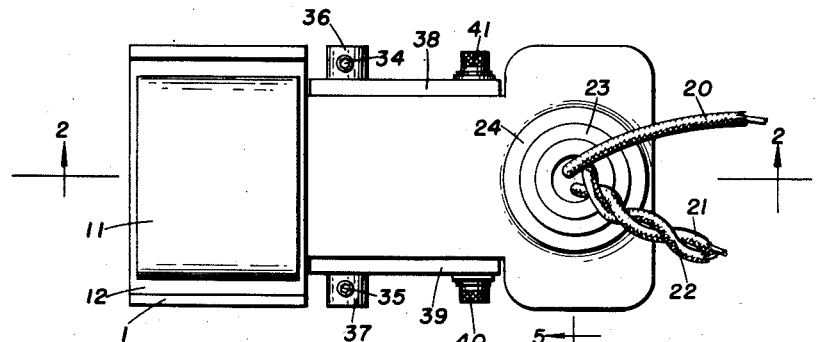
Fig. 1 is a plan of an accelerometer embodying the invention.
Figure 2:
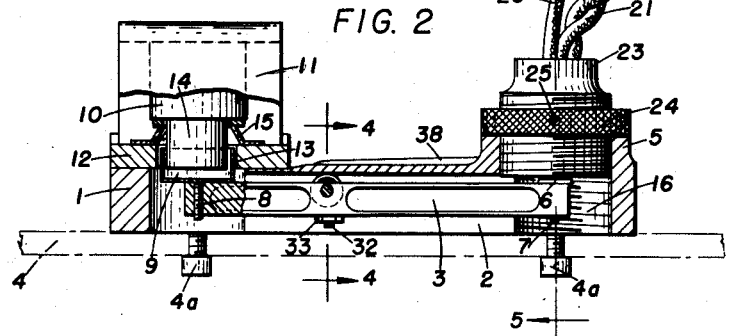
Fig. 2 is a section in the plane 2—2 of Fig. 1, small portions being shown in elevation.
Figure 3:
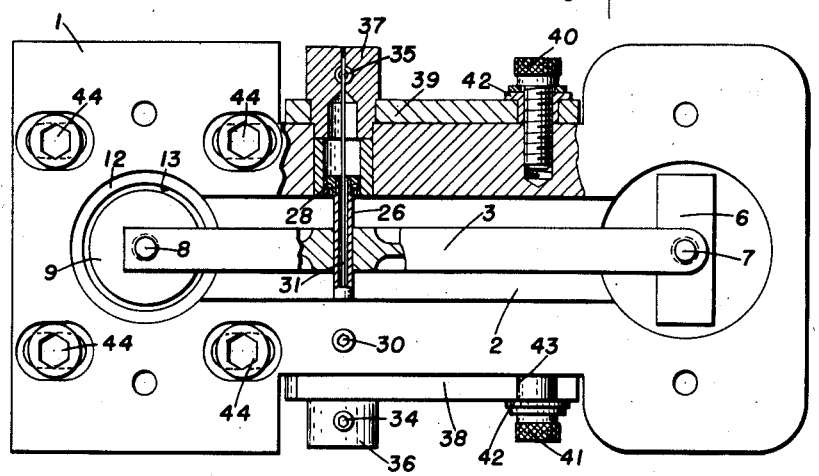
Fig. 3 is a bottom view on an enlarged scale, partly broken away and in section.

Referring first to Figs. 1 and 2, the device comprises an elongated frame 1 which has a longitudinally located slot 2 therein in which is pivotally mounted a lever 3. The frame 1 may be secured to the object whose angular acceleration is to be determined, for example, a wall 4 of a missile or other vehicle, as by screws 4a. The lever 3 constitutes the element of the accelerometer that responds to the angular acceleration and must be shaped properly and mounted accurately. As it is desirable that the lever 3 should be very light and yet have a considerable moment of inertia, all superfluous metal is removed from it, except at the pivot and at its two ends by making it of I-beam cross-section. At its right-hand end, as shown in Fig. 3, the lever 3 carries an armature plate 6 of ferro-magnetic material, secured by a screw 7. As best shown in Fig. 3, the plate 6 is preferably rectangular.

Figure 6:
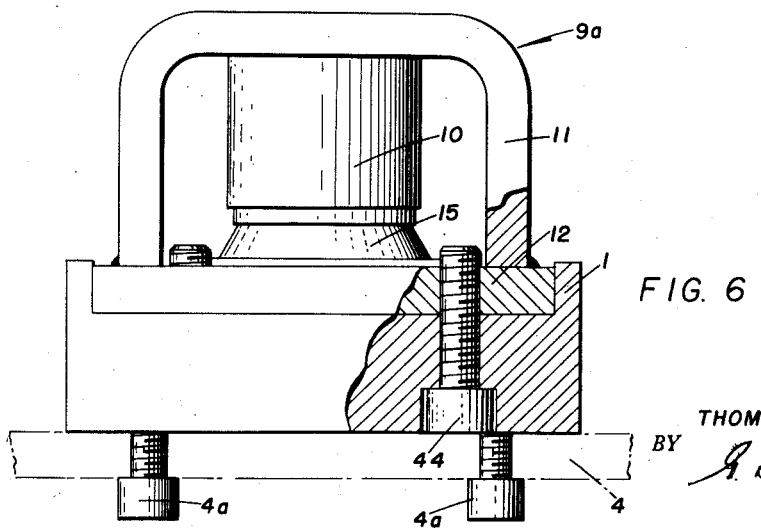
Fig. 6 is an end elevation, partly in section.

At its left end (in Fig. 3) the lever 3 carries a cup 9 made of metal having good electrical conductivity, preferably copper, said cup being held to the lever 3 by a screw 8. The cup 9 co-operates with a permanent magnet 9a having a magnetized core 10 of cylindrical shape, a U-shaped yoke 11, Fig. 6, and a flat-pole-plate 12, said plate, as shown in Fig. 2, having a circular hole 13 therein encircling the pole 14 of the core 10, and forming the other pole of the magnet.

This magnet construction is similar to that conventionally used in permanent-magnet type dynamic speakers, and provides a very intense field in the air gap between poles 13 and 14. A flange 15 of generally frusto-conical shape is preferably provided to protect the magnet against entry of dirt and particles of magnetic material. The entire assembly which comprises elements 8 to 15 inclusive, is adjustably secured to frame 1 by screws 44 and constitutes the magnetic damping means.

Figure 5:
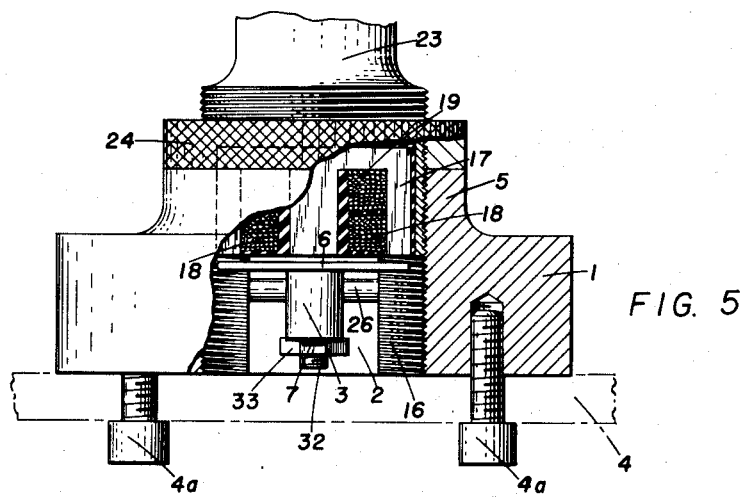
Fig. 5 is a section in the plane 5—5 of Fig. 2, a portion of the frame of the device being shown in elevation.

As shown in detail in Fig. 5, the frame 1 has at its right-hand end a tubular lug 5. This lug is internally threaded at 16, to receive the correspondingly externally threaded casing of an "E-core" and its transformer windings. This is a core 17 made of E-shaped laminations carrying the windings 18 and 19 which, as shown in Figs. 1 and 2, have one common tap or terminal 20 and two individual outer terminals 21 and 22, for connection into a suitable oscillator circuit, not shown. The core 17 is secured in a tubular externally threaded casing 23, that fits in the lug 5, and may be adjusted longitudinally by means of said threads. However, as the core-ends must aline with the armature plate 6, so that the E-core and armature jointly may constitute a variable inductance assembly, it is clear that such adjustment is limited to half-turn steps and if intermediate positions of adjustment are desired they must be secured by other means, such as are described hereinafter. A knurled lock nut 24 is provided to secure the casing 23 against rotation when adjusted, and as a further precaution a socket-head screw 25 (Fig. 2) may be provided in the said lock nut itself. As shown in Figs. 2 and 5, the armature 6 completes the magnetic circuit of the E-core transformer to a varying extent, depending upon the air gaps between core and armature, and thus serves as an inductance varying means. The purpose of this will be explained hereinbelow.

Figure 4:
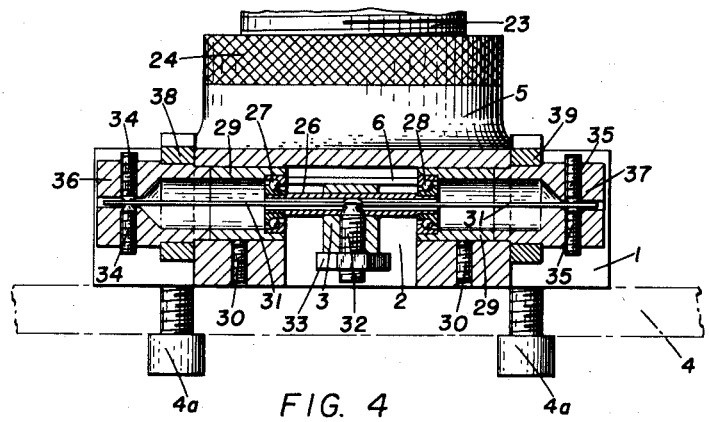
Fig. 4 is a section through the accelerometer, on a further enlarged scale, in the plane 4—4 of Fig. 2.

The lever 3 is mounted on a tube 26, Figs. 3 and 4, whose central portion is secured to the lever 3, and whose ends are mounted in ball bearings 27 and 28 carried in tubular guides or bushings 29 mounted in the frame 1 and held in place by set screws 30. The tube 26 thus allows the lever 3 to turn easily while nevertheless maintaining it properly alined with the rest of the device.

In order to generate torsional resistance proportional to the angle of rotation of the lever 3, a torsion rod 31 is provided. This conveniently is a length of spring wire such as spring-steel wire which passes through tube 26 and is clamped thereto at a single central location by a set screw 32 carried by lever 3. A lock nut 33 prevents loosening of said screw. The outer ends of said wire 31 are held by pairs of set screws 34, 35 in bushings 36, 37 which are mounted for rotary adjustment in the frame 1 through a limited angle.

Figure 7:
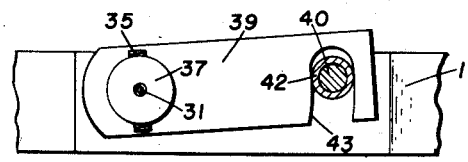
Fig. 7 is a detail of an adjusting lever.

Each of bushings 36, 37 has an adjusting link 38, 39 respectively secured thereto, these links being located on opposite sides of frame 1 as shown in Fig. 3. At their right-hand ends in the Fig. 7 position, the links have slots 43 therein and in each slot is a flanged washer 42, shaped as shown best in Fig. 3. Knurled socket head screws 40 and 41 are provided to secure each link in its adjusted position.

The operation of the invention will now be described briefly. Assuming that the device is secured to the vehicle whose angular acceleration is to be determined, with the torsion rod 31 parallel to the longitudinal axis of said vehicle, it is clear that whenever angular acceleration exists, the lever 3 will tend to remain in its original condition, due to its own inertia, and thus will apply torsion to the wire or rod 31 proportional to said angular acceleration. The tube 26 merely keeps the lever 3 properly alined, and thereby maintains the cup 9 and the armature 6 in correct relationship to the air gap of the damping magnet and the E-core respectively, without itself providing any torque, as said tube turns freely in its ball bearings 27 and 28.

The spacing of the armature 6 from the poles of said core may be adjusted in steps of one-half the pitch of threads 16 by turning the casing 23, and finer adjustment may then be secured by loosening the screws 40 and 41 and shifting the links 38 and 39 to control the initial adjustment of the torsion rod 31, whereupon said links may be held in adjusted position by again tightening the screws 40 and 41.

The copper cup 9 provides a damping torque due to the eddy currents produced therein by its motion in the strong magnetic field, and in addition provides a certain amount of air damping due to the small clearance of the cup over the pole piece 14 of core 10, which restricts the freedom of flow of the air into and out of said cup.

The inductances of the windings on the E-core are varied by the relative positions of the armature 6 with respect to the ends of said core, and this variation may be utilized to control the output frequency of an oscillator in which said windings are incorporated, and which thus may emit frequency modulated signals indicative of the acceleration that produces the variations.

Obviously many modifications and variations of the present invention are possible in the light of the above teachings. It is therefore to be understood that within the scope of the appended claims, the invention may be practiced otherwise than as specifically described.

What is claimed is:

1. In an angular accelerometer, a frame, a lever, a tubular shaft transverse to the lever and secured to said lever, anti-friction bearings mounted in the frame and supporting the ends of said shaft for free rotation, means housed within said shaft and secured to the lever at an intermediate point and having its ends secured to the frame, to generate torsional resistance upon pivotal motion of the lever, inductance varying means carried by one end of the lever, and motion damping means carried by the other end thereof.

2. In an angular accelerometer, a frame, a lever, a tubular shaft transverse to the lever and secured to said lever, anti-friction bearings mounted in the frame and supporting the ends of said shaft for free rotation, a spring housed within said tubular shaft and secured to the lever at an intermediate point and having its ends secured to the frame, to generate torsional resistance upon pivotal motion of the lever, inductance varying means carried by one end of the lever, and motion damping means carried by the other end thereof.

3. In an angular accelerometer, a frame, a lever supported in said frame to pivot freely about an axis transverse to said lever, said lever having at one end an armature of magnetic material, an open-magnetic circuit core carried by the frame with the open side thereof near and variably partially closed by said armature, said core having windings thereon, whereby the inductances of said windings are varied upon pivotal deflection of the lever, means for adjusting the position of said core to vary the spacing between said core and said armature, torsion generating means connected to said lever and to said frame, and magnetic motion damping means carried by the other end of the lever.

4. In an angular accelerometer as defined in claim 3, additionally a tubular shaft constituting the pivotal support of the lever, said shaft being secured to the lever, and anti-friction bearings mounted in the frame and supporting the ends of said shaft for free rotation.

5. In an angular accelerometer as defined in claim 3, additionally a tubular shaft constituting the pivotal support of the lever, said shaft being secured to the lever, and anti-friction bearings mounted in the frame and supporting the ends of said shaft for free rotation, the torsion generating means comprising a spring passing through the bore of the shaft.

6. In an angular accelerometer, a frame, a lever mounted in said frame to pivot about an axis transverse to said lever, torsional resistance generating means comprising a spring having a portion secured to the lever adjacent said axis, bushings mounted to turn in opposite sides of said frame, means securing the ends of the spring to the respective bushings, an adjusting link secured to each bushing for turning said bushing, and means for securing the links in their adjusted positions.

7. In an angular accelerometer as defined in claim 6, additionally a tubular shaft transverse to the lever and secured thereto, said spring passing through said shaft, and anti-friction bearings mounted in the frame and pivotally supporting the ends of said shaft.

8. In an angular accelerometer, a frame, a lever supported in said frame to pivot freely about an axis transverse to said lever, said lever having at one end an armature of magnetic material, a tubular shaft constituting the pivotal support of said lever, said shaft being secured to said lever, anti-friction bearings mounted in said frame and supporting the ends of said shaft for free rotation, a core constituting an open magnetic circuit carried by the frame with the open side of said circuit being partially closed by said armature, said core having windings thereon, the inductances of said windings being varied upon pivotal deflection of the lever, torsion generating means connected to said lever and to said frame, and magnetic motion damping means carried by the other end of the lever.

THOMAS WELLBORN SHEPPARD.

References Cited in the file of this patent

UNITED STATES PATENTS

| Number | Name | Date |
| --- | --- | --- |
| 2,032,381 | Stoutenburgh | Mar. 3, 1936 |
| 2,302,670 | Buchanan | Nov. 24, 1942 |
| 2,310,213 | Buchanan | Feb. 9, 1943 |
| 2,371,040 | Fisher | Mar. 6, 1945 |
| 2,398,666 | Reason | Apr. 16, 1946 |
| 2,487,793 | Esval et al. | Nov. 15, 1947 |
| 2,498,118 | Weiss | Feb. 21, 1950 |